April 11, 1933.  W. L. JONES  1,903,460
ANTISKID DEVICE
Filed Feb. 13, 1931

Inventor
W. L. Jones,
By Harry W. Johnson
Attorney

Patented Apr. 11, 1933

1,903,460

UNITED STATES PATENT OFFICE

WALTER L. JONES, OF EAST TAWAS, MICHIGAN

ANTISKID DEVICE

Application filed February 13, 1931. Serial No. 515,611.

My invention relates to anti-skid devices, more particularly to anti-skid devices for use on automobiles, and like vehicles and it consists of the combinations, constructions, and arrangements herein shown and described.

Automobilists and other operators of similar vehicles are well aware of the necessity of some means for use on conventional vehicles for preventing skidding and facilitating traction, when the same are passing along roads, which are covered with ice and snow. It is therefore a primary purpose of my invention to provide a means for preventing skidding that will be readily applicable to vehicles of usual construction without great modification thereof either as a separate attachment or a part of the vehicle, when manufactured.

A further object of my invention is to provide a device of the type described that is under the control of the operator for movements to positions of use and disuse as desired.

A still further object of my invention is to provide an anti-skid device making use of sharpened discs, that will automatically keep the said discs in sharpened condition.

A yet further object of my invention is to provide a device of the type described that can be thrown to the operative position with a minimum amount of effort on the part of the operator and in a minimum amount of time, a very important feature in devices of this character.

Still another object of my invention is to provide a device of the class described that has few parts, does not get out of order easily, and is simple to manufacture.

Other objects and advantages will appear as the specification proceeds and the device will be more particularly defined in the appended claims.

Figure 1:
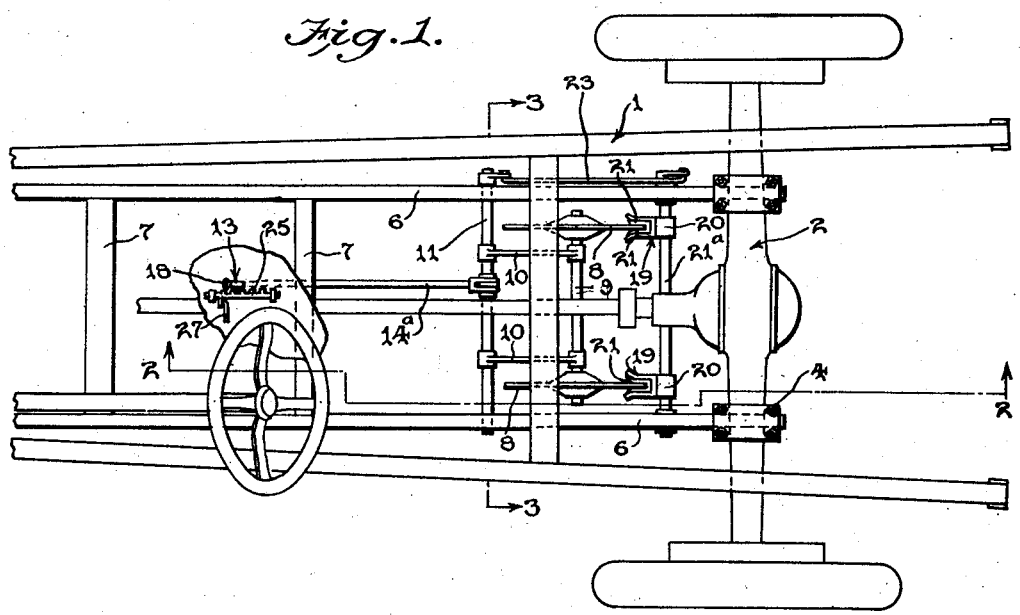
Figure 2:
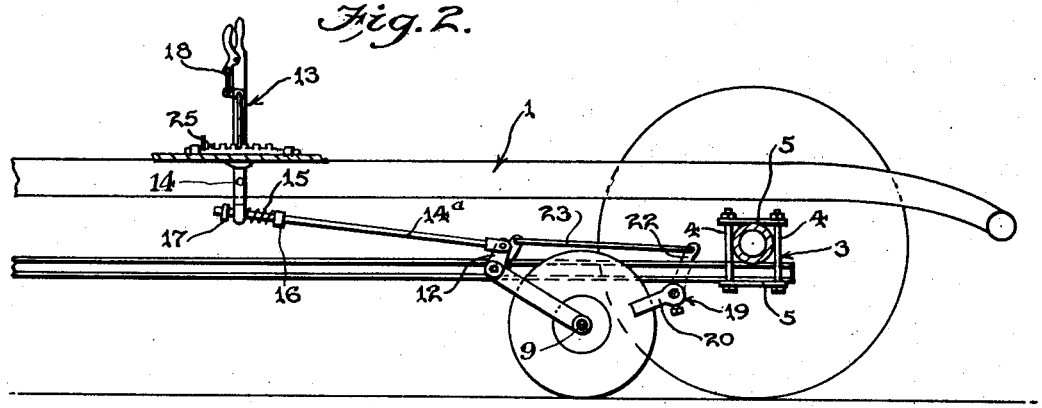
Figure 3:
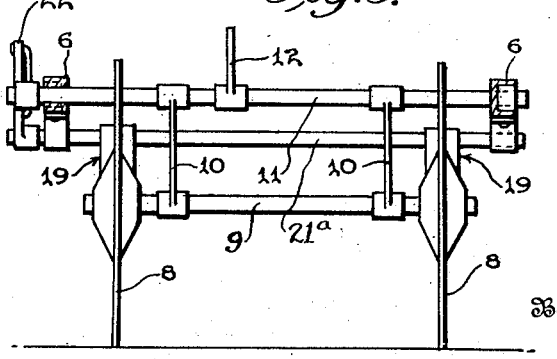
Figure 4:
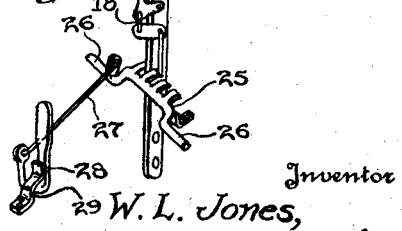

My invention is illustrated in the accompanying drawing forming a part of this application, in which Figure 1 is a top plan view of a portion of a vehicle frame equipped with my device, Figure 2 is a sectional view on line 2—2 of Figure 1, Figure 3 is a sectional view on line 3—3 of Figure 1, and Figure 4 is a perspective detail view of a portion of the device with parts broken away for clearness of illustration.

In carrying out my invention I make use of an ordinary automobile or vehicle of similar construction having a chassis or frame 1, and axles 2, the rear one only of which is shown in the drawing. It is to these axles 2 that I connect my anti-skid device. This is accomplished by means of clips 3, each of which consists of a plurality of bolt members 4 positioned on either side of the said axles and a pair of plates, one of which rests on its respective axle, and the other of which supports a part of the anti-skid frame.

This frame comprises a pair of longitudinally extending members 6, braced by laterally extending portions 7, and is connected to the front axle of the vehicle in a manner similar to the connection shown in Figure 1 to the rear axle. It is to this frame member that the operative portions of my anti-skid device are secured.

For cutting into the ice or snow to prevent lateral or skidding movements of the vehicle to enable the same to gain traction in a forward direction, I provide a pair of discs 8, supported by a shaft 9, held by arms 10, which are fixed to shaft 11 for rotation therewith, the shaft 11 being journaled for rotary movements on frame portions 6. This shaft also has connected to it for movement therewith an upstanding arm 12. It can readily be seen that the arms 10 in association with arm 12 provide a substantial bell-crank lever member.

For enabling the operator of the vehicle to reciprocate arm 12 to oscillate shaft 11 and consequently raise and lower the discs by means of arms 10, a hand lever 13 is provided. This lever is pivoted as indicated at 14 to a part of the frame of the vehicle and may be conveniently located adjacent the emergency brake of an automobile, or any other suitable place desired. It is connected to arm 12 by means of a rod 14a pivoted thereto, this connection being made more or less resilient for purpose of taking up shocks incident to operation by means of the spring 15 operative between said lever and a stop 16 on the rod. An additional stop 17 limits relative motion of the lever and the rod in the opposite direction. The lever is equipped with the usual ratchet-engaging pawl means 18, which may engage a ratchet of conventional construction or the ratchet shown of novel construction, which will be described in detail hereinafter.

For sharpening the discs 8, I provide a pair of sharpeners 19, each consisting of bifurcated members 20 having each a pair of emery or similar friction stones or members 21 therein engageable with either side of its respective disc. These friction members or blocks may be spring-pressed, if desired. The members 20 are connected for rotation with a shaft 21a, which is mounted for rotation on the frame members 6. This shaft 21a also carries a fixed arm 22, so that a substantial bell-crank lever is formed by the members 20 and the associated arm 22.

The arm 22 may be reciprocated for operation of the sharpeners into and out of engagement with the discs by means of a lever system similar to that controlling the discs or as shown by means of a link 23 connecting the same to an arm 24 on the shaft 11 controlled by lever 13 for simultaneous operation with the discs.

To enable the operator to throw the discs to the operative position in the quickest possible time, I equip the vehicle with my novel form of ratchet 25. This ratchet as appears most clearly in Figure 4 is hinged to the floor of the vehicle as indicated at 26 for swinging motion in one direction from the normal vertical position, for releasing the lever 13. This swinging motion is brought about by a lever system comprising the link 27, pivoted thereto and the foot lever 28 for operation of the link. This pedal could be positioned between the clutch and foot brake or in any suitable position desired. Its operation will allow the discs to fall to the ground as can be easily understood. A leaf spring member 29 serves to maintain the parts in the normally inoperative position.

From the foregoing description the use and operation of my device is easily understood. When the operator is travelling over dry roads, or other surfaces, which do not require the use of the anti-skid means, he simply draws the lever 13 backwardly and retains the same in this position by means of the latch-bar thereon which engages with the rack. This operation swings the discs upwardly out of engagement with the road or other surface in a manner easily understood.

When the operator desires to use the anti-skid means, he simply releases the lever 13 from engagement with the rack and throws the same forwardly or allows the same to fall forwardly under action of the force of gravity acting on the parts, thus bringing the discs into contact with the road or similar surface to engage the ice or snow thereon and thus prevent skidding. If the snow is soft he may let the lever 13 ride freely depending upon the force of gravity to hold the discs in contact with the snow-covered surface, or, if the road is covered with ice or frozen snow, he may assure contact of the discs therewith by placing the lever 13 in engagement with one of the forward notches of the rack. The spring 15 of course will buffer the shocks in any case.

If the operator desires to throw the anti-skid device to the operative position instantaneously he need only strike the pedal 28 with a lateral motion of his foot to swing the rack away from engagement with lever 13, thus permitting the same to fall under the action of gravity to bring the discs into engagement with the running surface below the vehicle. The spring will return the pedal and rack to the vertical position as soon as the pressure of the foot of the operator is removed.

During the above operations the sharpeners will be automatically positioned for engagement with the discs, when the same are lowered and for disengagement when elevated, thus assuring efficient operation of said discs at all times.

It is thus seen that I have provided an anti-skid device that is easily attachable to and detachable from vehicles without great modification thereof; that is under the control of the operator at all times for positioning in the operative or inoperative positions; and that is automatically kept in efficient operative condition throughout its period of use.

It is also seen that I have provided an anti-skid device that is constructed of a minimum number of parts, which will not get out of order easily, and that is simple to manufacture.

What I desire to claim and secure by Letters Patent is:

1. In combination with an automobile, an anti-skid device, comprising anti-skid members for engagement with the road surface, arms for supporting said anti-skid members, an oscillatory shaft mounting said arms, a crank-arm on said shaft, a link pivoted to said crank arm, and a hand-lever operatively connected to said link for moving said discs into and out of engagement with the road surface at will, the connection between said hand-lever and said link being resilient.

2. In combination with an automobile, an anti-skid device comprising rotary anti-skid discs for engagement with the road surface, and sharpening means for engagement with said discs.

3. In combination with an automobile, an anti-skid device comprising rotary anti-skid discs for engagement with the road surface, means for swinging said discs into and out of engagement with the road surface at the will of an operator, means for sharpening said discs, and means for swinging said sharpening means into engagement with said discs when in the operative position and out of engagement therewith when in the inoperative position.

4. In combination with an automobile, an anti-skid device comprising rotary anti-skid discs for engagement with the road surface, means for swinging said discs into and out of engagement with the road surface at the will of an operator, means for sharpening said discs, and means for swinging said sharpening means into engagement with said discs when in the operative position and out of engagement therewith when in the inoperative position, consisting of arms for supporting said sharpening means, an oscillatory shaft mounting said arms, a crank on said shaft, and means connecting said crank to said disc-moving means for reciprocation thereof in synchronism with the movements of said disc-moving means.

5. In combination with an automobile, an anti-skid device comprising anti-skid members for engagement with a road surface, a vertically extending hand-lever for moving said anti-skid members to the engaging and disengaging positions, a rack swingable between a horizontal and a vertical plane for engagement with said lever in its vertical position, and a foot-pedal for operating said rack to the disengaged position to bring said anti-skid members into engagement with the road surface under action of the force of gravity.

6. In combination with an automobile, an anti-skid device comprising anti-skid members for engagement with a road surface, a vertically extending hand-lever for moving said anti-skid members to the engaging and disengaging positions, a rack swingable between a horizontal and a vertical plane for engagement with said lever in its vertical position, a foot-pedal for operating said rack to the disengaged position to bring said anti-skid members into engagement with the road surface under action of the force of gravity, and resilient means for normally urging said pedal to the rack-engaged position.

WALTER L. JONES.